United States Patent
Dho

(10) Patent No.: US 6,733,135 B2
(45) Date of Patent: May 11, 2004

(54) IMAGE PROJECTION APPARATUS

(75) Inventor: Sang-whoe Dho, Suwon (KR)

(73) Assignee: Samsung Electronics Co., Ltd., Gyunggi-do (KR)

( * ) Notice: Subject to any disclaimer, the term of this patent is extended or adjusted under 35 U.S.C. 154(b) by 0 days.

(21) Appl. No.: 10/404,437

(22) Filed: Apr. 2, 2003

(65) Prior Publication Data

US 2003/0184715 A1 Oct. 2, 2003

(30) Foreign Application Priority Data

Apr. 2, 2002 (KR) .................................. 2002-0018095

(51) Int. Cl.[7] .............................................. G03B 21/00
(52) U.S. Cl. .................. 353/31; 359/831; 359/834; 353/33; 353/81; 345/82; 345/83; 348/804
(58) Field of Search ................................ 353/31, 33, 38, 353/81; 345/39, 46, 82, 83; 348/804; 359/831, 834, 837; 349/8

(56) References Cited

U.S. PATENT DOCUMENTS

| | | | |
|---|---|---|---|
| 3,872,451 A | * | 3/1975 | McNaney .................... 365/117 |
| 4,098,548 A | * | 7/1978 | McNaney .................... 359/263 |
| 6,227,669 B1 | * | 5/2001 | Tiao et al. ..................... 353/31 |
| 6,547,400 B1 | * | 4/2003 | Yokoyama .................... 353/98 |

* cited by examiner

*Primary Examiner*—Russell Adams
*Assistant Examiner*—Michael Dalakis
(74) *Attorney, Agent, or Firm*—Sughrue Mion, PLLC

(57) ABSTRACT

An image projection apparatus including a light source for emitting a plurality of monochromatic color beams having different wave lengths; a first light transmit unit; a light switch unit having a plurality of mirrors for selectively deflecting the monochromatic color beams at a predetermined angle; a quadrangular beam generating unit for converting the reflected monochromatic color beams into quadrangular beams having certain ratios of length to height; a panel for receiving the converted quadrangular beams and forming a monochromatic color bar on at least one portion of upper, mid, and lower portions thereof; and a projection lens unit disposed opposite to the panel. Accordingly, by using the light switches, a monochromatic color bar is formed on single panel with the same utilization efficiency of light as that of three panels, thereby embodying a high image quality.

16 Claims, 4 Drawing Sheets

IMAGE PROJECTION APPARATUS

BACKGROUND OF THE INVENTION

1. Field of the Invention

The present invention relates to an image projection apparatus, and more particularly, to an image projection apparatus for forming red (R), green (G), and blue (B) color bars on a single panel using light switches arranged in the structure of square matrix. This Application claims priority from Korean Patent Application No. 2002-0018095, filed Apr. 2, 2002, which is incorporated in full herein by reference.

2. Description of the Prior Art

A projector or a projection system displays an image by projecting an inputted image signal onto a screen. Such a display device is used to aid in a presentation at a meeting, or used in places such as a theater or home.

A conventional method used in order to realize a wide vision in the display device is magnifying an image displayed on a Liquid Crystal Display (LCD), a Cathode Ray Tube (CRT) or some such other display with a lens and projecting the image onto a screen. However the conventional method may be advantageous in achieving the wide vision, yet it is relatively weak in guaranteeing a clear image quality. In order to solve this problem, an image projection apparatus employing a Digital Micromirror Device (DMD) panel has been suggested.

The DMD is a semiconductor light switch using a micro drive mirror, i.e. micromirror. This micromirror controls a deflection of light according to an inputted image signal. In the DMD according to a digital method, a reproduction of color of the image signal is excellent and also a contrast between light and shade is clear. Since the DMD does not require A/D·D/A conversion, a clear image can be obtained. Also, since there is no loss of light that is caused by a polarizing filter, the DMD can obtain large amount of light output.

FIG. 1 is a view showing a basic structure of a conventional image projection apparatus using a color wheel.

Referring to FIG. 1, the conventional image projection apparatus 100 using a conventional color wheel comprises a light source 110, a color wheel 120, a DMD panel 130, and a projection lens 140. A light path of white light is indicated by one-dotted line in FIG. 1.

The light source 110 emits the white light using an arc lamp or a laser beam. The color wheel 120 is rotated by a rotation driver in an arrowed direction of FIG. 1 and has R (red), G (green), and B (blue) regions.

The white light emitted from the light source 110 is subdivided into R.G.B. beams by the R.G.B. regions.

The DMD panel 130 comprises a plurality of micromirrors 130a. The R.G.B. beams divided according to the respective wavelengths are projected onto the DMD panel 130 and then deflected from the micromirrors 130a. The deflected R.G.B. beams penetrate the projection lens 140 and are formed on the screen as an image.

The conventional image projection apparatus 100 can process response signals with respect to the divided R.G.B. beams rapidly due to the presence of the individually operated micromirror 130a. That is, with a simplified structure, excellent quality of color image can be realized.

However, when a color filter such as the color wheel 120, and the DMD panel 130 are used to form an image, the DMD panel 130 uses only ⅓ amount of the white light emitted from the light source 110. For example, with respect to the R region of the color wheel 120, the R beam penetrates the color wheel 120, while the G and B beams are blocked by the color wheel 120 and discarded. This phenomenon occurs with respect to the G and B beams.

Accordingly, since only ⅓ amount of the incident white light is used in the color filtering method, a brightness of the image is reduced to ⅓. That is, since the amount of white light emitted from the light source 100 is reduced while penetrating the color wheel 120, light efficiency deteriorates and optimal brightness of the image cannot be obtained.

SUMMARY OF THE INVENTION

An object of the present invention is to provide an image projection apparatus capable of enhancing the use of light that is decreased to ⅓ at a single panel, by using a high reflective mirror.

The above object of the present invention is achieved by providing an image projection apparatus comprising: a light source for emitting a plurality of monochromatic color beams having different wave lengths; a first light transmit unit having a plurality of optical fibers which the respective monochromatic color beams pass through; a light switch unit having a plurality of mirrors for selectively deflecting the monochromatic color beams at a predetermined angle; a quadrangular beam generating unit for converting the reflected monochromatic color beams into quadrangular beams having certain ratios of length to height; a single panel for receiving the converted quadrangular beams and forming a monochromatic color bar on at least one portion of upper, mid, and lower portions thereof; and a projection lens unit disposed opposite to the single panel.

More specifically, the light switch unit comprises a plurality of output ports disposed at output terminals thereof, for outputting the monochromatic color beams. The monochromatic color beam deflected from a first mirror among the plurality of mirrors is output through an output port corresponding to the first mirror. The image projection apparatus further comprises a second light transmit unit having a plurality of optical fibers for transmitting the monochromatic color beam output from the output port into the quadrangle beam generating unit.

The mirror comprises: a deflection mirror having one deflection surface; and a drive unit for driving the deflection mirror such that the defection mirror varies from a first position to a second position, the reflection mirror at the first position deflects the monochromatic color beams to any one of the upper, mid, and lower portions of the panel, the reflection mirror at the second position allows the monochromatic color beams to pass therethrough.

The light switch unit has the mirrors arranged according to a square matrix structure of (n×n), with n being a positive number greater than or equal to 3. The light switch unit is operated such that only one mirror is positioned at the first position with respect to one row and one column. The mirrors are Micro Electro Mechanical System (MEMS) mirrors.

Each of the (n×n) mirrors is positioned at the first position at least one time by a predetermined order to realize one image. The n equals the number of monochromatic color beams of different wavelengths emitted from the light source. A predetermined order comprises an illumination sequence of n light illuminations.

And during one sequence, each of the upper, mid, and lower portions of the panel receives at least one illumination from each of the monochromatic color beams of different wavelengths emitted from the light source.

The panel is a Digital Micromirror Device (DMD) for modulating the plurality of the monochromatic color bars into a digital signal and deflecting the signal to the projection lens unit. The projection lens unit concentrates the incident beams from the panel and projects the beam onto a display device.

The above object of the present invention is achieved by providing an image projection apparatus comprising: light source means for emitting a plurality of monochromatic color beams having different wave lengths; light switch means having a plurality of mirrors for selectively deflecting the monochromatic color beams at a predetermined angle; quadrangular beam generating means for converting the reflected monochromatic color beams into quadrangular beams having certain ratios of width to height; and panel means for receiving the converted quadrangular beams by formation of a monochromatic color bar on at least one of an upper, mid, and lower portion thereof.

More specifically, the light switch means has the plurality of mirrors arranged according to a square matrix structure of (n×n), with n being a positive integer greater than or equal to 3

According to the present invention, the R.G.B color bars are formed by using light switches arranged in the structure of square matrix of 3×3, thereby improving the utilization efficiency of the light.

BRIEF DESCRIPTION OF THE DRAWINGS

The above objects and features of the present invention will become more apparent by description of preferred embodiments of the present invention with reference to the accompanying drawings, in which.

DETAILED DESCRIPTION OF THE PREFERRED EMBODIMENT

Hereinafter, the present invention will be described in greater detail with reference to the accompanying drawings.

Figure 1:
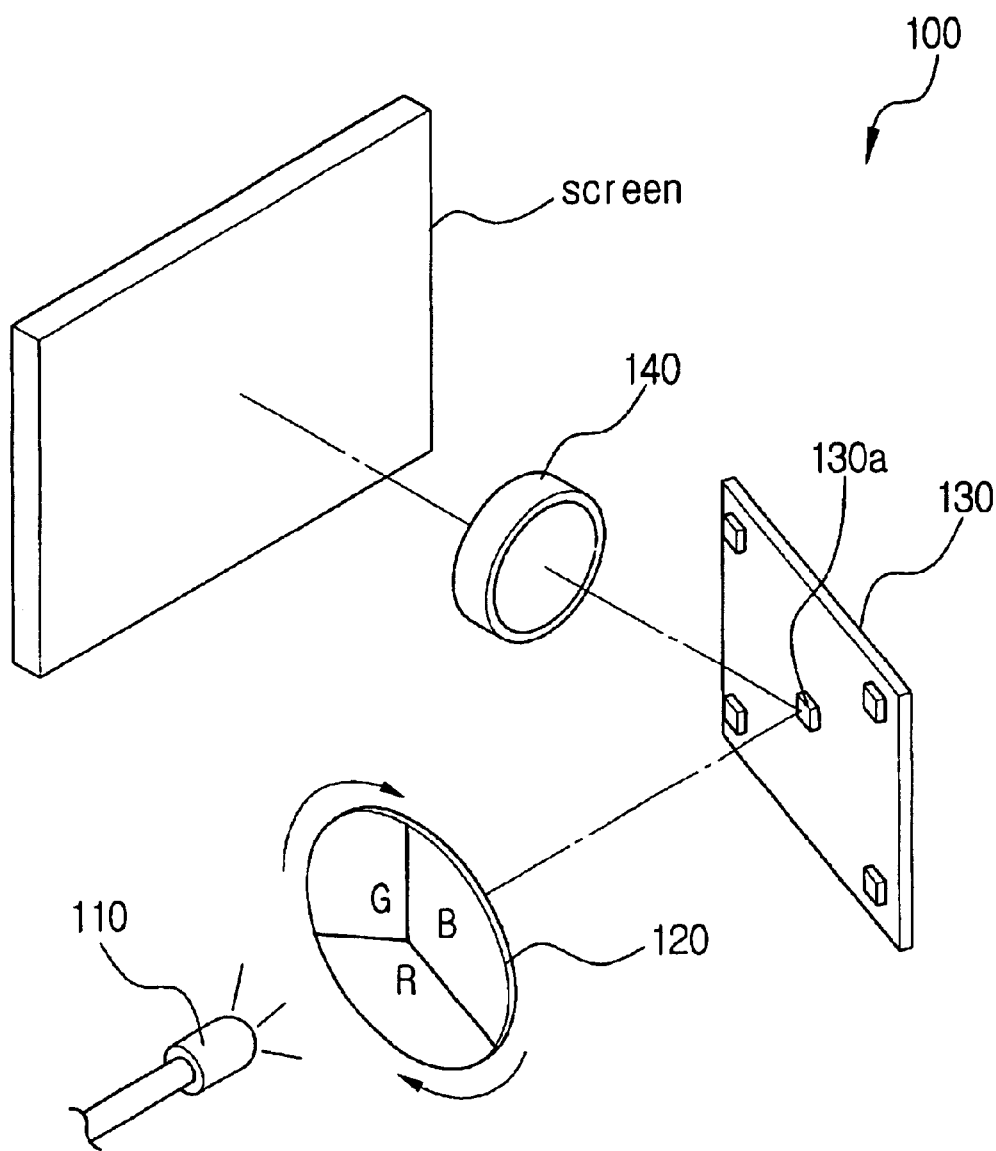
FIG. 1 is a view showing a basic structure of a conventional image projection apparatus using a color wheel.
Figure 2:
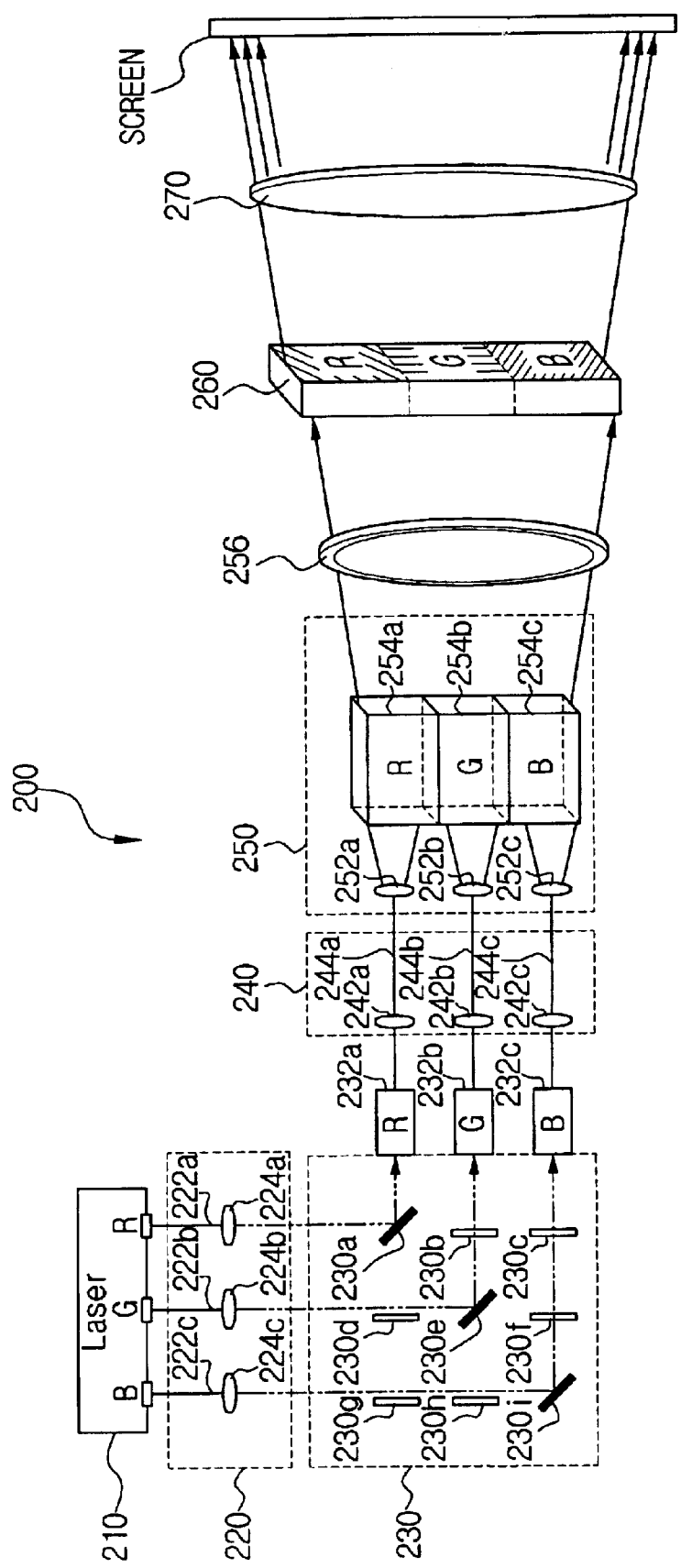
FIG. 2 is a view showing a basic structure of an image projection apparatus according to the preferred embodiment of the present invention.

FIG. 2 is a view showing a basic structure of an image projection apparatus according to the preferred embodiment of the present invention.

Referring to FIG. 2, an image projection apparatus 200 according to the present invention comprises a light source 210, a first light transmit unit 220, a light switch unit 230, a second light transmit unit 230, a quadrangular beam generating unit 250, a single panel(or one panel) 260 and a projection lens unit 270.

In the present embodiment, the image projection apparatus 200 has the light switches arranged in the matrix structure of (3×3). Light paths of respective R.G.B. laser beams in the light switch unit 230 are respectively illustrated. For example, a light path of the R laser beam, which is deflected from a predetermined light switch 230a and inputted into a first output port 232a, is indicated by a dotted line.

The light source 210 emits a plurality of monochromatic color beams having different wave-lengths. The light source 210 uses a laser beam, an arc lamp, a metal halide lamp, a halogen lamp or a xenon lamp, or any such light source suitable for performing as required for the present invention. The present invention uses the laser beam by way of an example. The plurality of monochromatic color beams (hereinbelow, called "laser beams") are, for example, red (R), green (G), and blue (B) laser beams.

The first light transmit unit 220 has a plurality of first optical fibers 222a, 222b, 222c and a plurality of first collimating lenses 224a, 224b, and 224c. The first optical fibers 222a, 222b, and 222c allow the respective R.G.B. laser beams to pass therethrough, and the first collimating lenses 224a, 224b, and 224c concentrate the laser beams transmitted through the optical fibers 222a, 222b, 222c. The first collimating lenses 224a, 224b, and 224c are disposed at output ends of the first optical fibers 222a, 222b, and 222c. The laser beams concentrated at the first collimating lenses 224a, 224b, and 224c are transmitted to the light switch unit 230.

The light switch unit 230 comprises a plurality of light switches for deflecting the respective R.G.B. laser beams at a predetermined angle or allowing the R.G.B. laser beams to pass therethrough. The light switch unit 230 has a matrix structure of (n×n), wherein n is a positive number. In other words, the light switch unit 230 has the light switches 230a through 230i as many as (n×n). In this embodiment, the light switch unit 230 has nine (9) light switches 230a through 230i arranged in the square matrix of (3×3).

The light switches 230a through 230i use high reflective mirror embodied by utilizing Micro Electro Mechanical System (MEMS) Technology. The light switches 230a through 230i output the R.G.B. laser beams directly as the light signal without the process of converting an input light signal into an electric signal. Accordingly, the switching speed is faster than in the conventional method which requires the process of converting the light signal into the electric signal.

Figure 3:
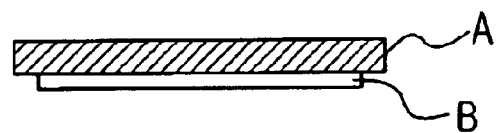
FIG. 3 is a view showing a basic structure of light switches employed in an image projection apparatus according to the present invention.

Each of the light switches 230a through 230i has a deflection mirror A and a drive unit B (FIG. 3). The deflection mirror A has a deflection surface formed on a side thereof, for deflecting the laser beams, and is fabricated by utilizing the MEMS technology. The position of the deflection mirror A is varied from a first position (on-position) to a second position (off-position) by the drive unit B. The first position (on-position) allows a laser beam (among the R.G.B. laser beams) to be deflected from the deflection mirror A to any one portion of upper, mid, and lower portions of the DMD panel 260, while the second position (off-position) allows the R.G.B. laser beams to go straight and not be directed toward the panel 260.

That is, the first position (on-position) is the state where the light switches 230a through 230i are inclined to deflect the laser beams to desired output ports 232a, 232b, and 232c. The second position (off-position) is the state where the light switches 230a through 230i are in parallel relation to the direction of the laser beams passing through the light switches 230a through 230i.

Also the light switch unit 230 is operated such that only one light switch in a row and a column is positioned at the first position. The light switch unit 230 is operated such that the three light switches are simultaneously positioned at the first position or the (3×3) light switches 230a through 230i are positioned at the first position by a predetermined order.

For example, if a light switch 230a is positioned at the first position (on-position), the other light switches 230b, 230c, 230d, and 230g disposed in the same row and column as the light switch 230a are positioned at the second position (off-position). At this time, if another light switch 230e is positioned at the first position, the light switch unit 230 sets another light switch 230i to be positioned at the first position.

One image is realized when each of the (3×3) light switches 230a through 230i is positioned at the first position at least one time.

At the output terminal of the light switch unit 230 are provided a plurality of output ports 232a, 232b, and 232c. The output ports 232a, 232b, and 232c output the laser beams deflected from the light switches 230a through 230i of the light switch unit 230 into the second light transmit unit 240. The second light transmit unit 240 has a plurality of second collimating lenses 242a, 242b, and 242c and a plurality of second optical fibers 244a, 244b, 244c. The second collimating lenses 242a, 242b, and 242c concentrate the respective R.G.B. laser beams received through the output ports 232a, 232b, and 232c to the respective second optical fibers 244a, 244b, and 244c. The second optical fibers 244a, 244b, and 244c transmit the concentrated R.G.B. laser beams to the quadrangular beam generating unit 250.

The quadrangular beam-generating unit 250 has a plurality of first lenses 252a, 252b, and 252c, a plurality of light tubes 254a, 254b, and 254c, and a second lens 256. The quadrangular beam generating unit 250 is disposed at output ends of the second optical fibers 244a, 244b, and 244c, for converting the respective laser beams to a quadrangular beam.

The first lenses 252a, 252b, 252c disperse the respective R.G.B. laser beams such that the respective R.G.B. laser beams can be incident on the light tubes 254a, 254b, and 254c corresponding to the first lenses 252a, 252b, and 252c. The light tubes 254a, 254b, and 254c are shaped as a hexahedron and have passage holes formed therein. The respective light tubes 254a, 254b, and 254c consist of four surfaces made of mirrors. When the laser beams dispersed from the first lenses 252a, 252b, and 252c are incident in the passage hole defined in the light tube 254a, 254b, and 254c, the laser beams are converted to quadrangular beams that have a predetermined ratio of width to height. The second lens 256 disperses the quadrangular beams such that the beams are incident on the single panel 260.

The single panel 260 consists of one digital micromirror device (DMD) panel or one liquid crystal display (LCD) panel. Hereinafter, the present invention using the DMD panel will be described.

The DMD panel 260 receives the monochromatic color beams i.e. the respective R.G.B. laser beams converted into the quadrangular beams to form the R.G.B. color bars on the upper, mid and lower portion thereof as shown in FIG. 2. As shown in FIG. 2, R color bar is illustrated in an oblique line, G color bar in a vertical line, and B color bar in a reverse oblique line.

The DMD panel 260 has a plurality of drive mirrors. The drive mirrors digitalize the respective R.G.B. color bars formed on the DMD panel 260 and deflect them at a predetermined angle. The image deflected from the DMD panel 260 is projected onto a screen through the projection lens unit 270. The projection lens unit 270 is disposed opposite the DMD panel 260.

According to another embodiment of the present invention, the LCD panel can be used instead of the DMD panel. While DMD panel is a deflection type panel, the LCD panel is a projection type panel. When the LCD panel is used, the position of the projection lens and the screen can vary.

Figure 4A:
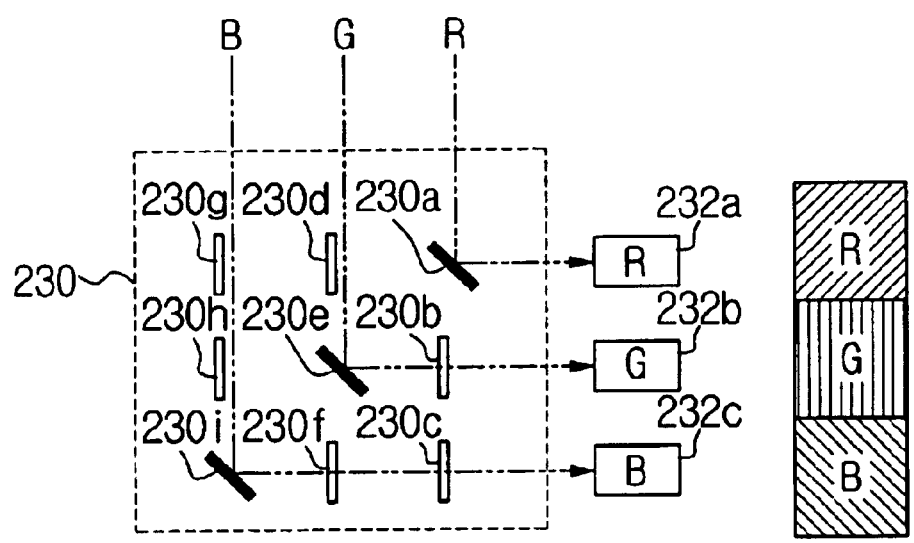
FIGS. 4A through 4C are views showing one image formed as the light switches are manipulated by a predetermined order according to the present invention.
Figure 4B:
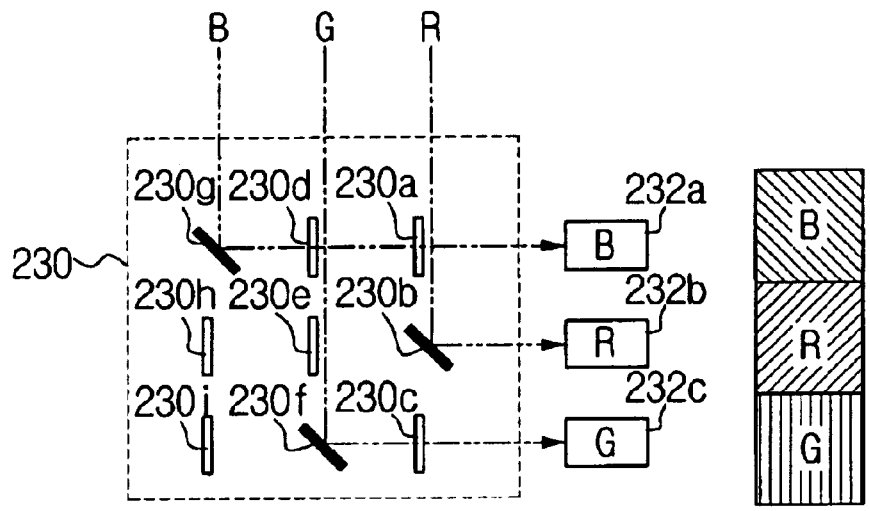
Figure 4C:
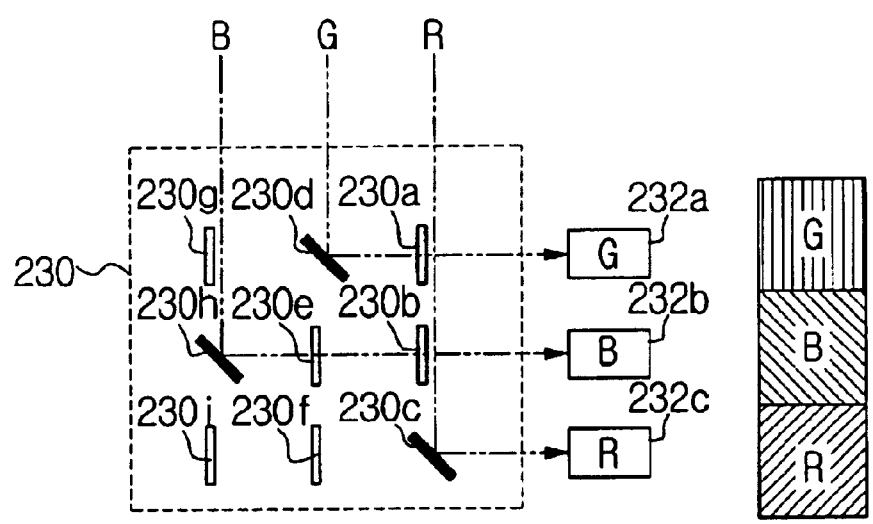

FIGS. 4A through 4C are views showing a process of realizing one image by a certain order of manipulation according to the preferred embodiment of the present invention. One image is realized by performing a series of processes as illustrated in FIGS. 4A through 4C. These processes can be changed without departing from the spirit of the invention.

Referring to FIGS. 4A and 4C, the R laser beam transmitted through the first light transmit unit 220 is incident on any one of the light switches 230a through 230c arranged in the first column, the G laser beam on any one of the light switches 230d through 230f arranged in the second column, and the B laser beam on any one of the light switches 230g through 230i arranged in the third column.

Also, the laser beams deflected from the light switches 230a, 230d, 230g of the first row form a color bar on the upper portion of the DMD panel 260 through the first output port 232a, the laser beams deflected from the light switches 230b, 230e, and 230h of the second row form a color bar on the mid portion of the DMD panel 260 through the second output port 232a, and the laser beams deflected from the light switches 230c, 230f, and 230i of the third row form a color bar on the lower portion of the DMD panel 260.

These three monochromatic color bars are formed on the upper, mid, and lower portions of the DMD panel 260 by manipulating the light switch unit 230. When the nine (9) light switches 230a through 230i of the light switch unit 230 are operated according to the following table 1, the color bars are formed on the DMD panel 260 as shown in FIG. 4A.

TABLE 1

|  | Port 1 | Port 2 | Port 3 |
| --- | --- | --- | --- |
| RED | 230a: ON | 230b: OFF | 230c: OFF |
| GREEN | 230d: OFF | 230e: ON | 230f: OFF |
| BLUE | 230g: OFF | 230h: OFF | 230i: ON |

In the table 1, 'ON' corresponds to the first position that allows the laser beams to be deflected, and 'OFF' corresponds to the second position that allows the laser beams to pass through the light switches. Reference numerals 230a through 230i indicate the light switches. If the light switch unit 230 manipulates the light switches 230a through 230i according to table 1, the color bars are formed on the DMD panel 260 as shown in FIG. 4A. That is, the R color bar is formed at the upper portion, the G color bar at the middle portion, and the B color bar at the lower portion.

Also, when the nine light switches 230a through 230i of the light switch unit 230 are operated according to the following table 2, the color bars are formed on the DMD panel 260 as shown in FIG. 4B

TABLE 2

|  | Port 1 | Port 2 | Port 3 |
| --- | --- | --- | --- |
| RED | 230a: OFF | 230b: ON | 230c: OFF |
| GREEN | 230d: OFF | 230e: OFF | 230f: ON |
| BLUE | 230g: ON | 230h: OFF | 230i: OFF |

In the table 2, 'ON' corresponds to the first position that allows the laser beams to be deflected, and 'OFF' corresponds to the second position that allows the laser beam to pass through the light switches. Reference numerals 230*a* to 230*i* indicate the light switches. If the light switch unit 230 is operated according to the table 2, the color bars are formed on the DMD panel 260 as shown in FIG. 4B. That is, the B color bar is formed at the upper portion, R color bar at the mid portion, and G color bar at the lower portion.

Also, when the nine light switches 230*a* through 230*i* of the light switch unit 230 are operated according to the following table 3, the color bars are formed on the DMD panel 260 as shown in FIG. 4C.

TABLE 3

|       | Port 1      | Port 2      | Port 3      |
|-------|-------------|-------------|-------------|
| RED   | 230a: OFF   | 230b: OFF   | 230c: ON    |
| GREEN | 230d: ON    | 230e: OFF   | 230f: OFF   |
| BLUE  | 230g: OFF   | 230h: ON    | 230i: OFF   |

In the table 3, 'ON' corresponds to the first position that allows the laser beams to be deflected, and 'OFF' corresponds to the second position that allows the laser beam to pass through the light switches. Reference numerals 230*a* through 230*i* indicate the light switches. If the light switch unit 230 is operated according to the table 3, the color bars are formed on the DMD panel 260 as shown in FIG. 4C. That is, the G color bar is formed at the upper portion, B color bar at the mid portion, and R color bar at the lower portion.

According to the image projection apparatus, by forming monochromatic color bars on the panel sequentially using the light switches that utilize the MEMS technology, the use of light on the panel can be improved. That is, the light switches make it possible to achieve the efficient use of light of the three panels. Accordingly, the brightness of the formed image can be improved. Also, since the light switches output the light signal directly without the process of converting the light signal into the electric signal, the on/off switching speed increases.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structures described herein as performing the recited function and not only structural equivalents but also equivalent structures.

What is claimed is:

1. An image projection apparatus comprising:

a light source for emitting a plurality of monochromatic color beams having different wavelengths;

a first light transmit unit having a plurality of optical fibers which the respective monochromatic color beams pass through;

a light switch unit having a plurality of mirrors for selectively deflecting the monochromatic color beams at a predetermined angle;

a quadrangular beam generating unit for converting the reflected monochromatic color beams into quadrangular beams having certain ratios of width to height;

a panel configured to receive the converted quadrangular beams by formation of a monochromatic color bar on at least one of an upper, mid, and lower portion thereof; and a projection lens unit disposed opposite the panel.

2. The image projection apparatus of claim 1, wherein the light switch unit comprises a plurality of output ports disposed at output terminals thereof configured to output the monochromatic color beams.

3. The image projection apparatus of claim 2, wherein the monochromatic color beam deflected from a first mirror among the plurality of mirrors is output through an output port corresponding to the first mirror.

4. The image projection apparatus of claim 3, further comprising a second light transmit unit having a plurality of optical fibers for transmitting the monochromatic color beam output from the output port into the quadrangle beam generating unit 5. The image projection apparatus of claim 1, wherein a mirror of the plurality of mirrors comprises:

a deflection mirror having one deflection surface; and a drive unit configured to drive the deflection mirror such that the deflection mirror varies from a first position to a second position, wherein the deflection mirror at the first position deflects the monochromatic color beam to any one of the upper, mid, and lower portions of the panel, and the deflection mirror at the second position allows the monochromatic color beam to pass therethrough.

6. The image projection apparatus of claim 1, wherein the light switch unit has the mirrors arranged according to a square matrix structure of (n×n), with n being a positive integer greater than or equal to 3.

7. The image projection apparatus of claim 6, wherein the light switch unit is operated such that at any one moment only one mirror is positioned at the first position with respect to one row and one column.

8. The image projection apparatus of claim 7, wherein each of the (n×n) mirrors is positioned at the first position at least one time according to a predetermined order to realize one image.

9. The image projection apparatus of claim 8, wherein n equals the number of monochromatic color beams of different wavelengths emitted from the light source.

10. The image projection apparatus of claim 8, wherein the predetermined order comprises an illumination sequence of n light illuminations.

11. The image projection apparatus of claim 10, wherein during one sequence, each of the upper, mid, and lower portions of the panel receives at least one illumination from each of the monochromatic color beams of different wavelengths emitted from the light source.

12. The image projection apparatus of claim 1, wherein the mirrors are Micro Electro Mechanical System (MEMS) mirrors.

13. The image projection apparatus of claim 1, wherein the panel is a Digital Micromirror Device (DMD) for modulating the plurality of the monochromatic color bars into a digital signal and deflecting the signal to the projection lens unit.

14. The image projection apparatus of claim 1, wherein the projection lens unit concentrates the incident beams from the panel and projects the beam onto a display device.

15. An image projection apparatus comprising:

light source means for emitting a plurality of monochromatic color beams having different wave lengths;

light switch means having a plurality of mirrors for selectively deflecting the monochromatic color beams at a predetermined angle;

quadrangular beam generating means for converting the reflected monochromatic color beams into quadrangular beams having certain ratios of width to height; and panel means for receiving the converted quadrangular beams by formation of a monochromatic color bar on at least one of an upper, mid, and lower portion thereof.

16. The image projection apparatus of claim 15, wherein the light switch means has the plurality of mirrors arranged according to a square matrix structure of (n×n), with n being a positive integer greater than or equal to 3.

* * * * *